United States Patent [19]

Cataldo

[11] 4,193,436
[45] Mar. 18, 1980

[54] RUN-FLAT TIRE HAVING INTERNAL SUPPORT MEANS

[75] Inventor: Roy S. Cataldo, Birmingham, Mich.

[73] Assignee: General Motors Corporation, Detroit, Mich.

[21] Appl. No.: 881,165

[22] Filed: Feb. 27, 1978

[51] Int. Cl.² .......................................... B60C 17/04
[52] U.S. Cl. ............................. 152/158; 152/330 RF
[58] Field of Search ............ 152/158, 330 R, 330 RF; 301/64 R, 64 SD

[56] References Cited
U.S. PATENT DOCUMENTS 3,645,312  2/1972  Kolodziej .............................. 152/158

*Primary Examiner*—Joseph E. Valenza
*Assistant Examiner*—Gene A. Church
*Attorney, Agent, or Firm*—J. P. Moran

[57] ABSTRACT

The drawings disclose a pneumatic tubeless tire including circumferentially oriented runner segments or a running band. Each segment or band includes support means abutted against the drop center of the wheel rim and an outer portion capable of supporting the weight of the vehicle once the tire becomes deflated. More specifically, in one embodiment, the outer portion extends laterally across the tire, abutting against the oppositely disposed inner surfaces of the tire sidewalls, and in each embodiment, bolts, pins, or hinges are included to serve as the support means for radially supporting and retaining the segments or band in place when the tire becomes deflated.

5 Claims, 6 Drawing Figures

RUN-FLAT TIRE HAVING INTERNAL SUPPORT MEANS

This invention relates generally to pneumatic tires and, more particularly, to pneumatic tires having internal "run-flat" features.

Heretofore, various structures have been suggested for use inside a pneumatic tire to support the weight of the vehicle in the event of a deflated tire.

The object of this invention is to provide improved internal means for use in pneumatic tires for rotatably supporting a vehicle in the event of a "flat tire" condition.

Another object of the invention is to provide, for use on a drop center wheel rim, a pneumatic tubeless tire including the usual outer tread surface, oppositely disposed sidewalls, and a bead adjacent each inner sidewall end, and, in cooperation therewith, internal support means for supporting the tire outer tread and the weight of the vehicle should the tire become deflated, such support means including circumferentially oriented runner segments or a running band, and radially oriented support means for the segments or band, such support means being mounted at spaced intervals in the drop center portion of the rim.

These and other objects and advantages will become more apparent when reference is made to the following description and accompanying drawings, wherein.

Figure 1:
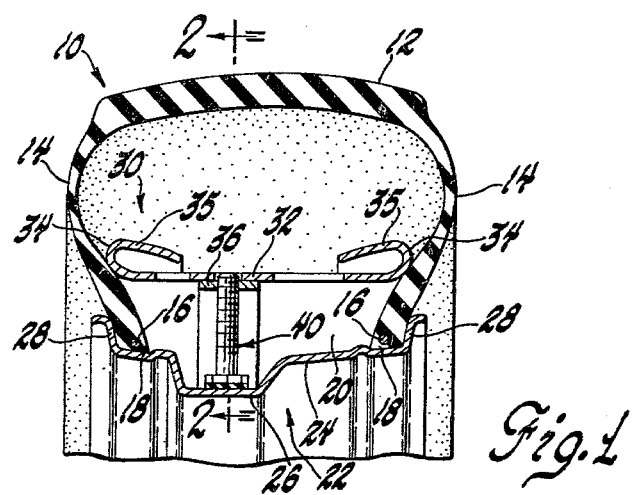
FIG. 1 is a fragmentary cross-sectional view of a wheel and pneumatic tire arrangement embodying the invention.
Figure 2:
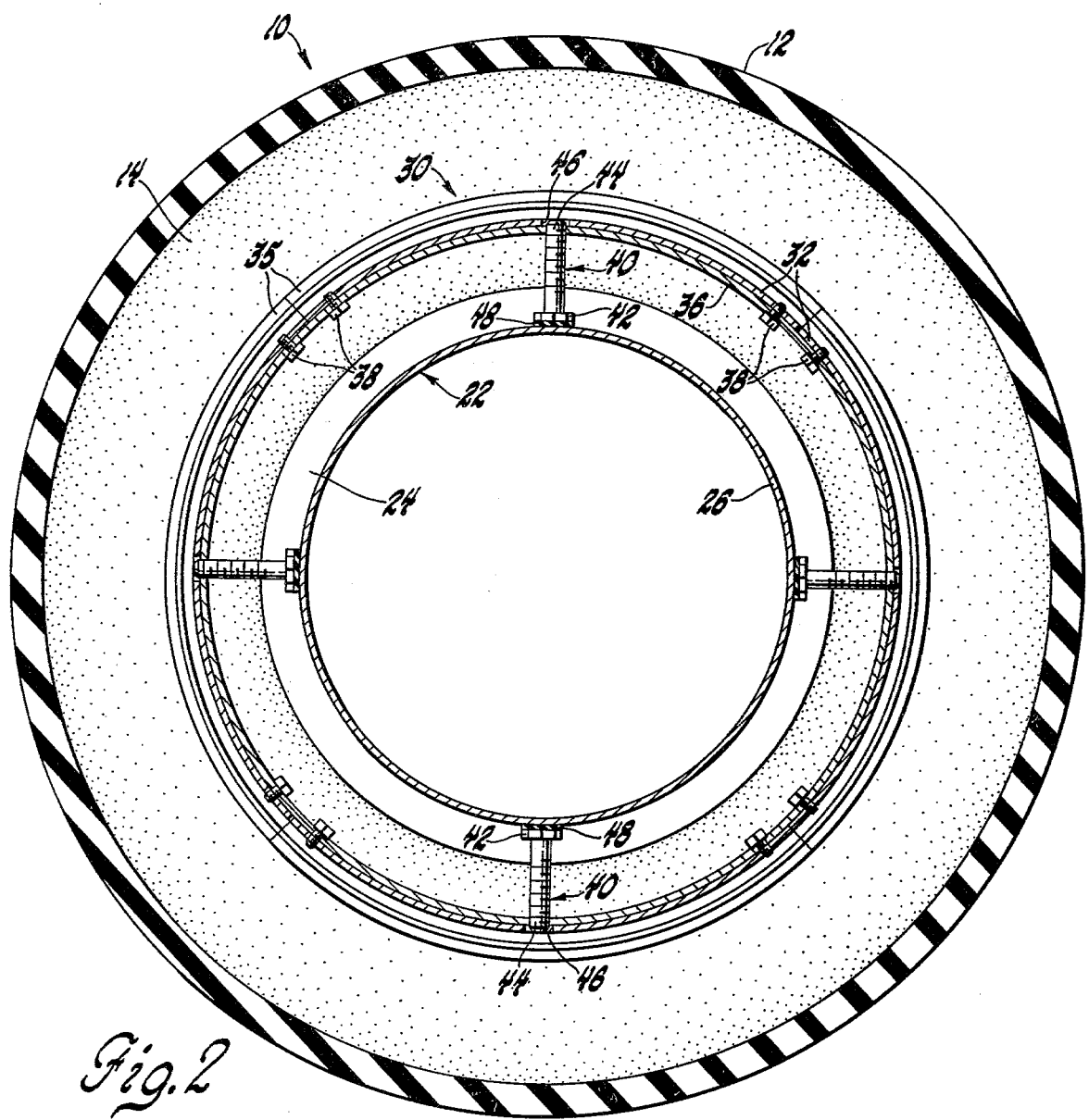
FIG. 2 is a cross-sectional view taken along the plane 2—2 of FIG. 1, and looking in the directions of the arrows.

Referring now to the drawings in greater detail, FIGS. 1 and 2 illustrate a pneumatic tubeless tire 10 including a carcass having an outer tread surface 12, oppositely disposed sidewalls 14, a bead 16 adjacent each inner sidewall end portion 18, and an annular opening 20 between the beaded ends, for mounting on a vehicle wheel 22 having a rim 24 including a drop center 26 and rim flanges 28 formed on oppositely disposed sides thereof for retaining the beaded ends 16/18 in sealing engagement therewith when the tire is inflated.

A tire stabilizer 30 is mounted circumferentially around the drop center 26 of the wheel 22, within the tire 10. The tire stabilizer 30 includes a plurality of circumferentially oriented arcuate metal support segments 32 extending laterally across the tire. A substantially toroidal-shaped edge portion 34 is formed along each edge of each segment 32 for seating on the oppositely disposed inner surfaces of the tire sidewalls 14 a predetermined distance radially outwardly of the beaded ends 16/18. A support flange 35, extending inwardly from the sidewall 14, is formed on each edge portion 34. A stabilizing ring 36, formed of sheet metal, is abutted against the inner surface of each of the support segments 32. Suitable fastener means, such as a metal screw 38 (FIG. 2), is threadedly connected between the stabilizing ring 36 and each support segment 32 adjacent each circumferential end of the latter.

A radially oriented support bolt 40 is mounted so as to have its head 42 abutted against the drop center 26 of the rim 24, and its threaded end 44 threadedly connected to the stabilizing ring 36 at substantially the circumferential center of each of the support segments 32, extending into apertures 46 formed in the latter, and threadedly adjusted therein so as to retain the toroidal-shaped end positions 34 in place against the oppositely disposed inner surfaces of the tire sidewalls 14.

A rubber washer or bumper 48 may be secured to the bolt head 42 for cushioning the bolt 40 against the drop center 26.

At assembly, one sidewall 14 of the tire 10 is mounted on one side of the wheel 22 in the usual manner. The arcuate support segments 32 are inserted into the tire from the open side, followed by the insertion of the stabilizing ring 36 and the metal screws 38 to form a closed ring. The first sidewall 14 is then moved past the drop center 26 to the opposite rim flange 28, after which the support bolts 40 are mounted in the drop center 26, threadedly connected to the ring 36, and adjusted to lock the stabilizer 30 in place. The other sidewall is then mounted adjacent the respective rim flange 28.

Should the tire 10 become deflated, it is apparent that the inner surface of the outer tread 12 adjacent the road surface abuts against the support flanges 35 of the segments 32, with the flanges thereafter supporting the weight of the vehicle and, thus, permitting the vehicle to continue to be driven.

Figure 3:
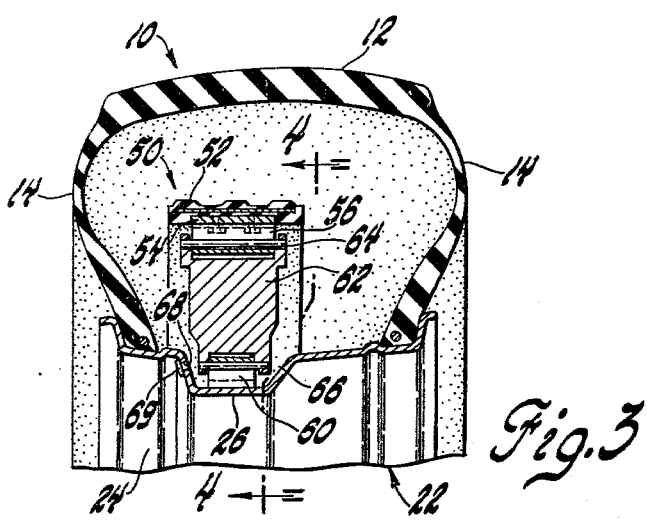
FIG. 3 is a fragmentary cross-sectional view of a wheel and pneumatic tire arrangement showing an alternate embodiment of the invention.
Figure 4:
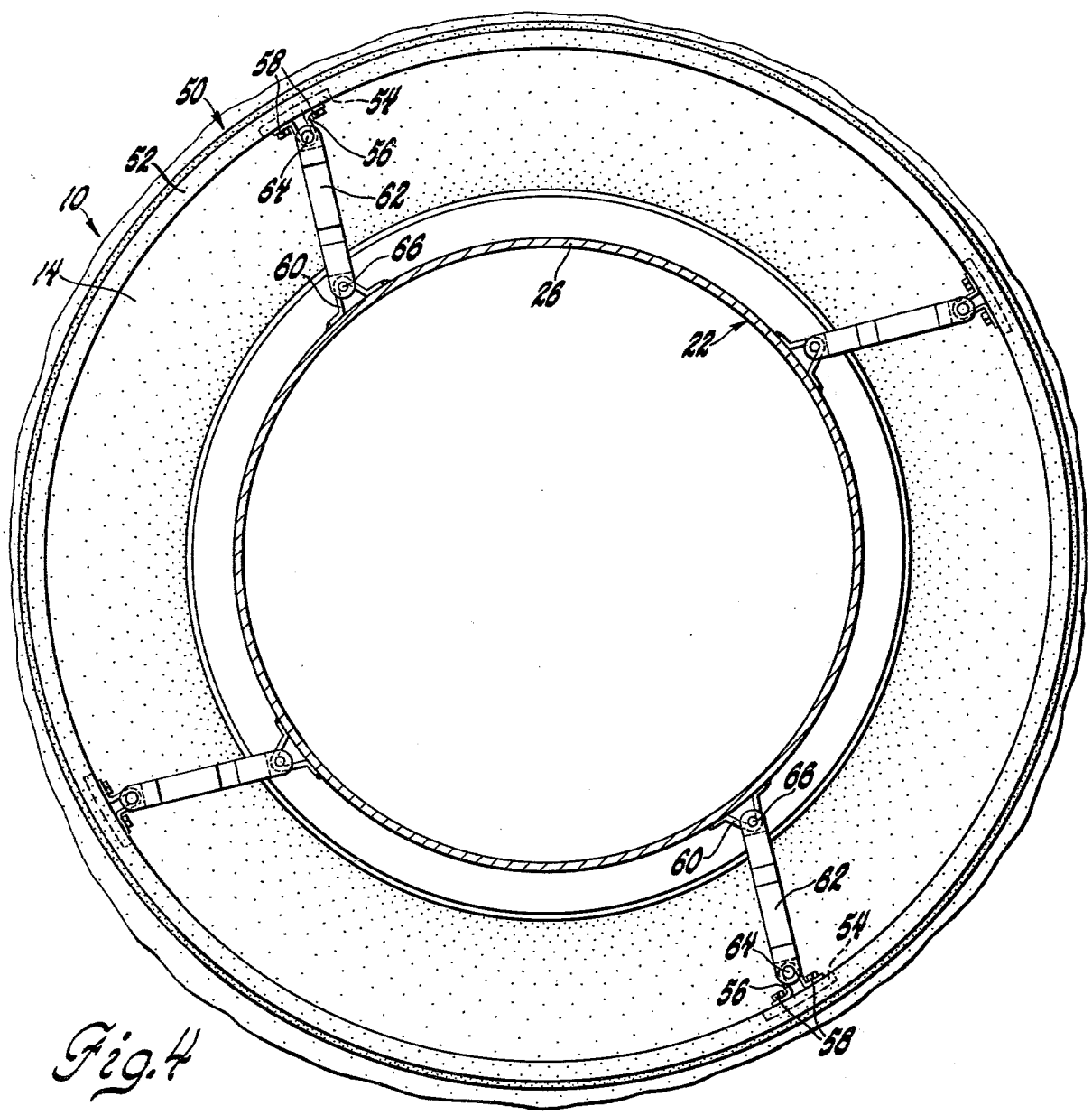
FIG. 4 is a fragmentary cross-sectional view taken along the plane 4—4 of FIG. 3, and looking in the directions of the arrows.

In the alternate embodiment shown in FIGS. 3 and 4, a tire stabilizer 50 includes a steel-reinforced rubber running band 52 having a plurality of circumferentially spaced threaded steel inserts 54 bonded to the inner surface thereof. Pin joint journals 56 are secured by metal screws 58 to the respective inserts 54. An equal number of spaced pin journals 60 are secured in any suitable manner, such as by welding, to the drop center 26.

A link 62 is connected at the respective ends thereof to oppositely disposed journals 56 and 60 by pins 64 and 66. The length of each link 62 is slightly greater than the radial distance between the journals 56 and 60, such that the links 62 angle slightly off radial in their assembled positions, as illustrated in FIG. 4.

At assembly, the stabilizer 50, except for the wheel journals 60, is assembled outside the tire 10 and inserted into the tire. One sidewall of the tire is then mounted in place on the wheel 22 and the stabilizer 50 positioned in the drop center 26. The inner ends of the links 62 are next secured to the journals 60 by virtue of the pins 66 being inserted through openings 68 formed in the adjacent side of the drop center 26, after which plugs 69 are inserted in the openings 68 and the other sidewall of the tire is mounted on the wheel. Should the tire become deflated in use, the running band 52 will support the weight of the vehicle permitting operation of the latter to be continued.

Figure 5:
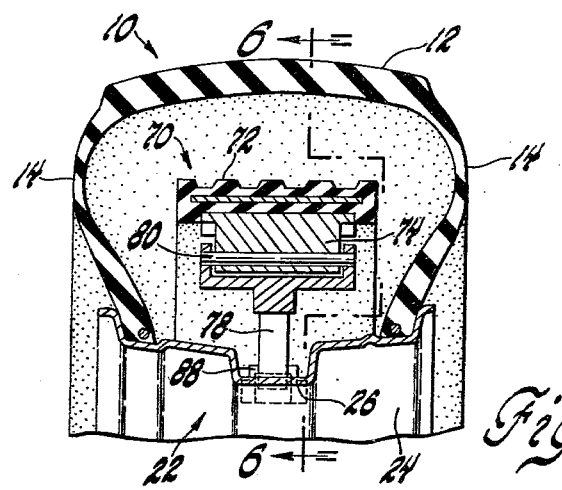
FIG. 5 is a fragmentary cross-sectional view of a wheel and pneumatic tire arrangement showing another alternate embodiment of the invention.
Figure 6:
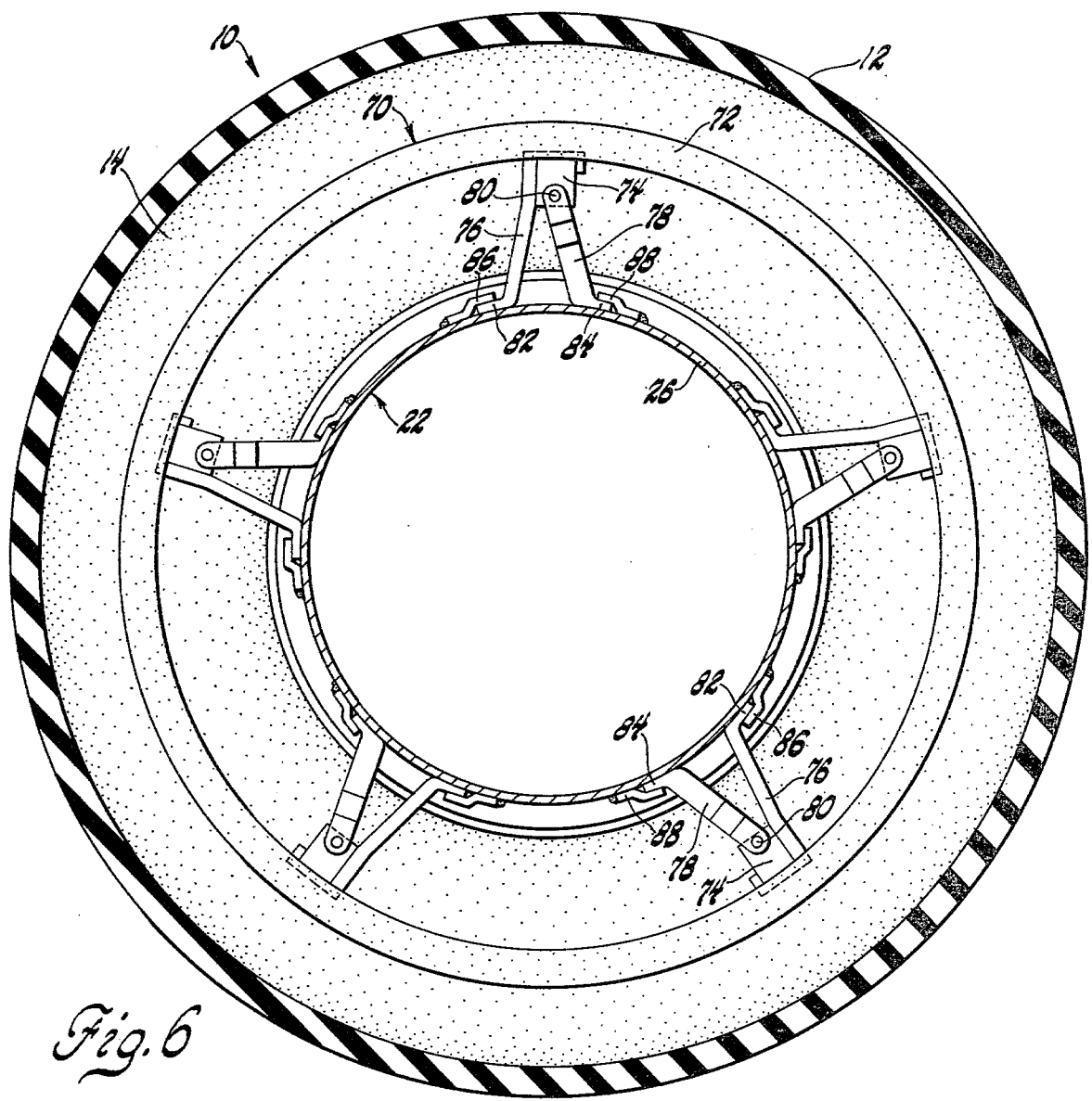
FIG. 6 is a cross-sectional view taken along the plane 66 of FIG. 5, and looking in the directions of the arrows.

The second alternate tire stabilizer 70, shown in FIGS. 5 and 6, includes a steel-reinforced rubber running band 72 with a plurality of circumferentially spaced support blocks 74 bonded to the inner surface thereof, each block having an inwardly directed support leg 76 formed thereon. A link 78 is pivotally mounted at one end thereof by a pivot pin 80 to each support block 74. Oppositely extended feet 82 and 84 are formed on the respective radially inner ends of the legs 76 and the links 78. The feet 82 and 84 are retained in suitable support lugs 86 and 88, respectively, which are secured, such as by welding, at predetermined circumferential locations in the drop center 26.

At assembly, after one sidewall 14 of the tire 10 has been mounted on the rim 24, the stabilizer 70 assembly is mounted in the tire and the feet 82 and 84 are inserted into the support lugs 86 and 88. The other sidewall 14 is then mounted on the rim 24. Thereafter, the running band 72 will support the weight of the vehicle should the tire 10 become deflated.

While but three embodiments of the invention have been shown and described, other modifications thereof are possible.

The embodiments of the invention in which an exclusive property or privilege is claimed are defined as follows:

1. For use within a pneumatic tire including a carcass having an outer tread portion, oppositely disposed sidewalls, a bead adjacent each inner sidewall end, and an annular opening between the beaded ends, on a vehicle wheel having an annular drop center rim with outer rim flanges formed on oppositely disposed sides thereof for retaining said beaded ends of said tire in sealing engagement therewith when said tire is inflated; a tire stabilizer comprising load support ring means concentric with said rim and disposed within said carcass intermediate said oppositely disposed sidewalls and radially outwardly of said rim, and a plurality of spaced substantially radially oriented support means, said support means being arcuately spaced from one another having open space therebetween, each of said support means having one end thereof operatively connected to said drop center rim and the other end thereof operatively connected to said load support ring means and cooperating with said wheel to provide the sole radial support of ring means and for retaining the latter in position to support said outer tread portion should said tire become deflated.

2. For use within a pneumatic tire including a carcass having an outer tread portion, oppositely disposed sidewalls, a bead adjacent each inner sidewall end, and an annular opening between the beaded ends, on a vehicle wheel having a rim with a drop center portion and outer rim flanges formed on oppositely disposed sides thereof for retaining said beaded ends of said tire in sealing engagement therewith when said tire is inflated; a tire stabilizer comprising a rigid running band disposed within said carcass intermediate said oppositely disposed sidewalls and radially outwardly of said drop center portion, a first plurality of spaced mounting means secured to the inner surface of said running band, a second plurality of spaced mounting means secured to said drop center portion of said rim, and a plurality of spaced substantially radially oriented support members, said support members being arcuately spaced from one another and having open space between adjacent support members, each of said support members having one end thereof operatively connected to one of said first plurality of spaced mounting means and the other end thereof operatively connected to one of said second plurality of spaced mounting means and cooperating with said wheel to provide the sole radial support of said running band and for retaining said running band in position to support said outer tread portion should said tire become deflated.

3. For use within a pneumatic tire including a carcass having an outer tread portion, oppositely disposed sidewalls, a bead adjacent each inner sidewall end, and an annular opening between the beaded ends, on a vehicle wheel having a drop center rim with outer rim flanges formed on oppositely disposed sides thereof for retaining said beaded ends of said tire in sealing engagement therewith when said tire is inflated; a tire stabilizer comprising a plurality of circumferentially oriented arcuate metal support segments extended laterally across said tire, toroidal-shaped end portions formed along each edge of said plurality of support segments for seating on the oppositely disposed inner surfaces of said tire sidewalls a predetermined distance radially outwardly of said beaded ends, a stabilizing ring abutted against the inner surface of each of said support segments, fastener means for securing said stabilizing ring to each of said support segments, and a radial support bolt having its head abutted against said drop center rim and its threaded end threadedly connected to said stabilizing ring at substantially the circumferential center of each of said support segments for retaining said torodial-shaped end portions in place against said oppositely disposed inner surfaces of said tire sidewalls with respect to said rim flanges and the portions of said tire walls confined between said rim flanges and said toroidal-shaped end portions when said tire becomes deflated.

4. For use within a pneumatic tire including a carcass having an outer tread portion, oppositely disposed sidewalls, a bead adjacent each inner sidewall end, and an annular opening between the beaded ends, on a vehicle wheel having a rim with a drop center portion and outer rim flanges formed on oppositely disposed sides thereof for retaining said beaded ends of said tire in sealing engagement therewith when said tire is inflated; a tire stabilizer comprising a metal-reinforced rubber running band disposed within said carcass intermediate said oppositely disposed sidewalls, a plurality of spaced mounting brackets secured to the inner surface of said running band, a plurality of spaced journals secured to said drop center portion of said rim, and a plurality of links, each link being pivotally connected at one end thereof to one of said mounting brackets and pivotally connected at the other end thereof to one of said journals, with each link being disposed at a predetermined angle with respect to a radial line and adapted to retain said running band in position to support said outer tread portion should said tire become deflated.

5. For use within a pneumatic tire including a carcass having an outer tread portion, oppositely disposed sidewalls, a bead adjacent each inner sidewall end, and an annular opening between the beaded ends, on a vehicle wheel having a rim with a drop center portion and outer rim flanges formed on oppositely disposed sides thereof for retaining said beaded ends of said tire in sealing engagement therewith when said tire is inflated; a tire stabilizer comprising a metal-reinforced rubber running band disposed within said carcass intermediate said oppositely disposed sidewalls, a plurality of spaced support arms bonded at one end thereof to the inner surface of said running band, a mounting bracket secured to each support arm at the bonded end thereof, a plurality of pairs of spaced lugs secured to said drop center portion of said rim, the other end of each of said support arms being inserted in one of each pair of spaced lugs, and a plurality of hinge members, each pivotally connected at one end thereof to one of said mounting brackets and having the other end thereof inserted in the other of each pair of spaced lugs, said support arms and said hinge members being adapted to retain said running band in position to support said outer tread portion should said tire become deflated.

* * * * *